US005897906A

United States Patent [19]

Suwa et al.

[11] Patent Number: 5,897,906

[45] Date of Patent: Apr. 27, 1999

[54] OIL AND FAT COMPOSITION FOR FRYING

[75] Inventors: Nobuyuki Suwa; Tomokazu Hirose, both of Tokyo; Toru Tagawa, Yokohama, all of Japan

[73] Assignee: Mitsubishi Chemical Corporation, Japan

[21] Appl. No.: 08/815,465

[22] Filed: Mar. 11, 1997

[30] Foreign Application Priority Data

| | | | |
|---|---|---|---|
| Mar. 12, 1996 | [JP] | Japan | 8-054851 |
| Aug. 19, 1996 | [JP] | Japan | 8-217340 |

[51] Int. Cl.$^{6}$ .................... A23D 9/007

[52] U.S. Cl. .................... 426/611; 426/601

[58] Field of Search .................... 426/601, 611

[56] References Cited

U.S. PATENT DOCUMENTS

| | | | |
|---|---|---|---|
| 3,429,714 | 2/1969 | Nelson | 426/611 |
| 4,948,811 | 8/1990 | Spinner | 426/611 |
| 5,490,995 | 2/1996 | Corrigan | 426/611 |
| 5,494,693 | 2/1996 | Cooper | 426/611 |
| 5,514,405 | 5/1996 | Yokomichi | 426/611 |
| 5,534,284 | 7/1996 | Corrigan | 426/611 |
| 5,733,594 | 3/1998 | Hirose | 426/611 |

FOREIGN PATENT DOCUMENTS

| | | |
|---|---|---|
| 3-31397 | 6/1989 | Japan . |
| 63139394 | 12/1989 | Japan . |
| 2-65744 | 3/1990 | Japan . |
| 1166311 | 2/1991 | Japan . |
| 5-209187 | 8/1993 | Japan . |
| 05045477 | 9/1994 | Japan . |
| 06253738 | 9/1994 | Japan . |
| 34621793 | 6/1995 | Japan . |
| 32921393 | 5/1996 | Japan . |

*Primary Examiner*—Carolyn Paden
*Attorney, Agent, or Firm*—Nixon & Vanderhye

[57] ABSTRACT

The present invention relates to an oil and fat composition for frying comprising: (A) an oil and fat having a solid fat content of 3 to 20% by weight at 20°C., and (B) a polyglycerin fatty acid ester of 0.01 to 5% by weight based on the total weight of (A) and (B), which has not less than 75% of a degree of esterification thereof and has not less than 90% by weight of the constituting fatty acid of the polyglycerin fatty acid ester which satisfy the following definitions (1) to (3): (1) the content of the saturated fatty acid having 8 to 12 carbon atoms being 10 to 55% by weight; (2) the content of the saturated fatty acid having 14 to 22 carbon atoms being 40 to 80% by weight; and (3) the content of the unsaturated fatty acid having 16 to 22 carbon atoms being 5 to 20% by weight.

6 Claims, No Drawings

OIL AND FAT COMPOSITION FOR FRYING

BACKGROUND OF THE INVENTION

The present invention relates to an oil and fat composition used for frying, and more particularly it relates to a frying oil and fat composition which shows good fluidity at room temperature, is not or is hardly solidified (or crystallized or coagulated) at room temperature, and also suffers little deterioration of its quality after heating in use.

Vegetable oils are oils derived from vegetables. Liquid state one such as rapeseed oil, and solid or half-solid state one such as palm oil and coconut oil are both called vegetable oil. Therefore, in the present invention, the vegetable oil which is solid or half-solid at room temperature is distinguished from the one which is liquid at room temperature, and is hereinafter described as vegetable “fat”. These vegetable oils and fats are used for applications where they are used to make the most of their respective properties—liquid, or solid or half-solid at room temperature.

Vegetable fats such as palm olein oil and hardened soybean oil are favorably used for frying doughnuts, croquettes and the like as they can create a more palatable crispness and a lighter texture than when using vegetable oils such as corn salad oil and rapeseed oil. These vegetable fats have good heat stability and can stay in a semisolid state at around room temperature (20–25° C.), so that they are popularly used for frying various kinds of fryer stuff. Also, inexpensiveness of these vegetable fats contributes to reducing the cost of the blended oil and fat preparations by increasing the mixing percentage of the vegetable fats. However, these vegetable fats or the blends with other oils and fats have the problem that they are inconvenient to use because of lack of fluidity and their tendency to solidify in the practical temperature range from 0° C. to room temperature. It has been pointed out that when the temperature of the storage environment of these vegetable fats is low, for instance in winter, their fluidity lowers to make it hard to take out from the container. Thus, techniques for preventing solidification of these oils and fats in the temperature range of around 0° C. to 20° C. and maintaining enough fluidity in such temperature range despite of formation of small quantities of solid fat crystals, have been demanded.

When the vegetable fats such as palm olein oil and hardened soybean oil are left in the air and allowed to cool by itself after used for frying, they are solidified as the ambient temperature drops, so that a considerable time is required for heating when resuming the frying operation the next day. Since such solidification of oils and fats is accelerated as their heat history prolongs, those oils and fats which are not or hardly solidified at around room temperature, have been demanded.

Further, the oils and fats for frying are subject to progressive deterioration of their quality in heating to cause a rise of carbonyl value or peroxide value, so that usually an anti-oxidizing agent such as tocopherol is added for preventing these phenomena, but its effect is unsatisfactory.

For preventing the vegetable fats from solidifying or for retarding their solidification at low temperatures, there have been known, for instance, the methods in which (1) a low-melting point vegetable oil containing an unsaturated fatty acid such as oleic acid in abundance is added, and (2) a sucrose lauric acid ester.

These methods, however, involve undesirable problems. In use of the vegetable oils and fats for frying, it is required that they contain solid fat (microcrystallized fat) for giving a savory effect, but if the content of such solid fat is high, it becomes not only difficult to control separating of solid fat or to retard solidification at low temperatures by the said conventional methods (1) and (2), but there also remains a smell of laurin in the fries to spoil their relish.

Various techniques, for example, a cold-resistant vegetable oil composition comprising of cold-resistant vegetable oil, polyglycerin fatty acid ester, sucrose fatty acid ester and lecithin, in Japanese Patent Application Laid-Open (KOKAI) No. 5-209187 have been proposed for overcoming this problem of solidification of frying oils and fats at low temperatures, but this proposal has not satisfied to solve the above-mentioned problems.

SUMMARY OF THE INVENTION

As a result of the present inventors' earnest studies for improving the said properties of the vegetable fats such as palm olein oil and hardened soybean oil used for frying, that is, their tendency to loose fluidity and solidify at around room temperature and their tendency to be accelerated in their solidification after heating (for trying), and for preventing progressive deterioration of quality of such fats and oils during heating, it has been found that the said properties of the vegetable fats can be remarkably improved by blending a specific polyglycerin fatty acid ester to the said vegetable fats. The present invention has been attained on the basis of this finding.

The gist of the present invention lies in an oil and fat composition for frying comprising:

(A) an oil and fat having a solid fat content of 3 to 20% by weight at 20° C., and (B) a polyglycerin fatty acid ester of 0.01 to 5% by weight based on the total weight of (A) and (B), which has not less than 75% of a degree of esterification thereof and has not less than 90% by weight of the constituting fatty acid of the polyglycerin fatty acid ester which satisfy the following definitions (1) to (3):

(1) the content of the saturated fatty acid having 8 to 12 carbon atoms being 10 to 55% by weight;

(2) the content of the saturated fatty acid having 14 to 22 carbon atoms being 40 to 80% by weight; and (3) the content of the unsaturated fatty acid having 16 to 22 carbon atoms being 5 to 20% by weight.

DETAILED DESCRIPTION OF THE INVENTION

The present invention is described in more detail. Component (A):

The oil and fat (A) used in the present invention is the one whose solid fat content at 20° C. is 3 to 20% by weight, preferably 10 to 20% by weight. This component (A) functions to dehydrate the fried stuff while percolating into its surface portion to give palatable crispness to the fry. When the solid fat content at 20° C. is less than 3% by weight, the amount of the solid fat is too small and the fry becomes too plain. On the other hand, when the solid fat content exceeds 20% by weight, the amount of solid fat is too large and the oil and fat becomes liable to solidify at low temperatures, making it unable to attain the object of the present invention.

In this case, a vegetable oil which is liquid at 20° C., such as refined rapeseed oil, refined soybean white oil or corn oil, is blended at a proper percentage for reducing the solid fat content to not more than 20% by weight. The solid fat content at 20° C. in the present invention is determined by the pulse NMR method described in YUKAGAKU (Journal of the Japan Oil Chemists society), Vol. 33, No. 3, pp. 33–39, 1984.

Examples of the oils and fats (A) usable in the present invention include palm olein oil, hardened soybean oil, hardened rapeseed oil, hardened cottonseed oil, hardened corn oil, hardened sesame oil, cacao butter, laurel seed oil, Borneo tallow, palm oil, and mixtures thereof with liquid oils such as rapeseed oil and soybean oil. Of these oils and fats, those comprising mainly palm olein oil or hardened soybean oil are preferred.

Palm olein oil is a low-melting point traction of palm oil, and this oil can be offered with various melting points by adjusting the producing conditions. As palm olein oil contains solid fat in a relatively large amount (10 to 20% by weight), it is mixed with a vegetable oil so that it can maintain a fluid state for use in winter. Hardened soybean oil can be produced by hydrogenating soybean oil to add hydrogen atoms to the unsaturated double bonds. Its melting point can be varied by changing the degree of hydrogenation. In use of these oils and fats for frying, the optimal melting point and solid fat content are decided in consideration of the fryer. Usually an oil and fat having a solid fat content of 10 to 20% by weight and a melting point of 20 to 30° C. is preferably used for frying. Component (B):

The polyglycerin fatty acid ester (hereinafter referred to as PoGE) used as component (B) in the present invention is constituted by a mixture of saturated and unsaturated fatty acids in which the content of the saturated fatty acid having 8 to 12 carbon atoms (hereinafter referred to as component (b1)) is 10 to 55% by weight; the content of the saturated fatty acid having 14 to 22 carbon atoms (hereinafter referred to as component (b2)) is 40 to 80% by weight; the content of the unsaturated fatty acid having 16 to 22 carbon atoms (hereinafter referred to as component (b3)) is 5 to 20% by weight, the total amount of the said components (b1), (b2) and (b3) in the ester being not less than 90% by weight, preferably not less than 95% by weight; and the esterification degree of the ester is not less than 75%.

It is considered that the component (B) is adsorbed on the component (A) and acts for keeping the oil and fat composition from solidifying or for preventing its solidification even when left under a low temperature condition for a long time. Therefore, the component (B) is required to have the property to be soluble in the component (A).

Regarding the mixing ratio of the said component (A) and component (B), experiments by the present inventors confirmed that when the amount of the component (B) is too small, it is impossible to attain the object of the present invention, while the effect produced by increasing the content of the component (B) is subject to certain limitations, that is, there can be obtained no additional effect even if its content is increased above a certain level. Therefore, in order to obtain the maximal effect, it is necessary that the content of the component (B) is within the range of 0.01 to 5% by weight, preferably 0.05 to 5% by weight, more preferably 0.1 to 3% by weight based on the total amount of the components (A) and (B).

The reason why the carbon number of the said saturated fatty acids of the component (b1) and is defined to be 8 to 12 and the carbon number of the said saturated fatty acids of the component (b2) is defined to be 14 to 22, is based on the fact that this type of saturated fatty acid exists in vegetable fats abundantly and is, therefore, easily available. The carbon number of the said unsaturated fatty acid (component (b3)) is defined to be 16 to 22 for the same reason.

Examples of the component (b1) (saturated fatty acids having 8 to 12 carbon atoms) include caprylic acid, capric acid, undecylic acid and lauric acid, and examples of the component (b2) (saturated fatty acids having 14 to 22 carbon atoms) include myristic acid, pentadecylic acid, heptadecylic acid, palmitic acid, octadecylic acid, stearic acid, arachic acid and beheric acid. These fatty acids may be used either singly or as a mixture of two or more of them, but in the case of the component (b2), it is preferred to use a mixture of two or more of these acids.

Examples of the component (b3) (unsaturated fatty acids having 16 to 22 carbon atoms) include oleic acid, linoleic acid, linolenic acid, elaisic acid, arachidic acid and erucic acid, which may be used either singly or as a mixture of two or more of them.

The other constituting fatty acids than the said components(b1), (b2) and (b3) are the short-chain saturated acids having less than 8 carbon atoms, the unsaturated fatty acids having less than 16 carbon atoms and the long-chain saturated or unsaturated fatty acids having more than 22 carbon atoms. These fatty acids are usually unavailable. PoGE containing the other components than the components (b1), (b2) and (b3) in excess of 10% by weight based on the total amount of the constituting fatty acids of the ester (B) lowers excessively in its effect of improving fluidity of the composition at or below room temperature while adsorbed on the component (A).

It is necessary that not less than 90% by weight of the constituting fatty acids of the component (B) is constituted by a mixture of 10 to 55% by weight, preferably 15 to 40% by weight of saturated fatty acid having 8 to 12 carbon atoms as the component (b1), 40 to 80% by weight, preferably 60 to 75% by weight of saturated fatty acid having 14 to 22 carbon atoms as the component (b2), and 5 to 20% by weighs, preferably 5 to 15% by weight of unsaturated fatty acid having 16 to 22 carbon atoms as the component (b3). By the presence of these components (b1), (b2) and (b3) in well-balanced proportions, the good adsorb ability on the component (A) can be attained, and the effect of controlling separating of solid fat to prevent the oil and fat composition from solidifying or to retard its solidification can be attained even if the composition is left at a low temperature for a long period of time. Incorporation of the component (b1) remarkably enhances the effect of controlling separating of solid fat, but if its content exceeds 55% by weight, the said effect is rather lowered. The incorporation of the component (b2) enhances the similar effect to the component (b1), but when its content exceeds 80% by weight, its action to promote solidification at low temperatures is sharply strengthened to lead an undesirable result. The component (b3) does not much contribute to controlling of solidification (separating of solid fat), but this component needs to be contained in an amount of 5 to 20% by weight for making the component (B) itself soluble in the oil and fat composition at a low temperatures to enhance adsorb ability on the component (A). When the component (b3) is less than 5% by weight, the solubility at a low temperatures is sharply reduced. When the component (b3) is more than 20% by weight, the solid fat separating controlling effect is remarkably deteriorated. Imbalance in ratio of these components (b1), (b2) and (b3) jeopardizes attainment of the object of the present invention to improve the fluidity at a low temperatures and that after heating to prevent deterioration of the oil/fat composition.

In the component B (polyglycerin fatty acid ester), the degree of esterification of fatty acid relative to polyglycerin is not less than 75%. If this degree of esterification is less than 75%, the solubility in oils and fats at a low temperatures deteriorates, and the solidification controlling effect also lowers. Preferably the said degree of esterification is in the range of 80 to 95%. The degree of polymerization of the polyglycerin (hereinafter referred to as PoG) is preferably not less than 4, more preferably 6 to 10.

Various methods are available for the preparation of PoGE, such as a direct esterification method (M. Yoshino et al: Bul. Ind. Chem., Vol. 68, No. 11, p. 99, 1965), an ester exchange method (U.S. Pat. No. 3,637,774 to V. K. Babayan, 1972) and an enzymatic method (Japanese Patent Publication (KOKOKU) No. 63-13677), but usually it is produced from the direct esterification of PoG obtained by polycondensing glycerin with a fatty acid.

As described above, the oil and fat composition for frying according to the present invention comprises essentially the component A and component B, but other substances may be optionally contained in the composition according to the purpose of use. Examples of the substances that can be optionally blended in the composition include spicery, coloring agents, vitamins, heat stabilizer, ultraviolet absorber, etc., which are soluble in the component A. These optional components may be blended in an amount within the range of 0.001 to 10% by weight based on the whole composition. It is also possible to blend other emulsifying agents such as sucrose fatty acid esters, monoglyceride and sorbitan fatty acid esters. Especially oil-soluble sucrose fatty acid esters comprising mixed fatty acids similar to those of PoGE used in the present invention are effective.

For producing the oil and fat composition for frying of the present invention, the prescribed amounts of the said component A, component B and if necessary other substances such as mentioned above are weighed out, and they are mixed uniformly by stirring under heating. The mixing method is not specified. The thus produced oil and fat composition for frying may be stored in suitable containers such as drums and gallon cans and shipped in subdivided matter.

A major use of the oil and fat composition of the present invention is frying of confectionery such as doughnuts, subsidiary dish such as croquettes, and the like.

The oil and fat composition for frying according to the present invention has the advantageous effects such as mentioned below and its industrial utility value is great.

1. The oil and fat composition for frying according to the present invention is not solidified or hard to solidify at room temperature of around 20° C. or below, so that the composition can maintain good fluidity and transparency at room temperature or below and is suited for use as an oil and fat for frying.
2. The oil and fat composition for frying according to the present invention is not solidified or can be greatly retarded in its tendency to solidify when it is left and allowed to cool naturally after use, so that the time required for heating can be greatly shortened when the composition is heated again for use.
3. The oil and fat composition for frying according to the present invention is minimized in deterioration even if the content of anti-oxidizing agent is not increased.

EXAMPLES

Examples 1–9 and Comparative Examples 1–6

The present invention is described in further detail with reference to the examples and comparative examples, but these examples are merely intended to be illustrative and not to be construed as limiting the scope of the invention.

In the following descriptions of the examples, all "percents (%)" are by weight unless otherwise noted, and the properties of the oil and fat compositions were determined by the following methods.

(1) Solid fat content (%) in oil and fat compositions at 20° C.

The solid fat content was determined by the pulse iM method described in YUKAGAKU (Journal of the Japan Oil Chemists Society), Vol. 33, No. 3, pp. 33–39, 1984.

(2) State of solidification of oil and fat when kept at 15° C.

In a mixture of palm olein oil and rapeseed oil (solid fat content at 20° C.: 7%), PoGE having a fatty acid composition shown in Table 1 was added in an amount of 1% by weight based on the total weight of the mixed oil, and they were mixed up by stirring at 60° C. to prepare a transparent and homogeneous oil and fat composition. 100 g of this oil and fat composition was collected in a glass sample bottle, then transferred into a 15° C. thermostat and kept therein. After two days, visual observation of the state of the oil and fat was conducted. The state of solidification of the oil and fat was determined by visually observing the solidified portion in the whole amount of the oil and fat or the sedimented portion of the oil and fat crystals which separated out into the liquid oil and evaluated according to the following criterion. The results are shown in Table 1.

◎: Liquid state, transparent and homogenous, or liquid state and slightly cloudy.

○: Has fluidity with the amount of sedimented oil and fat crystals being not more than 5%.

Δ: Lacks fluidity with the amount of sedimented oil and fat crystals being not less than 20%.

X: Solidified entirely.

(3) State of solidification of oil and fat when kept at 20° C.

PoGE having a fatty acid composition shown in Table 1 was added to palm olein oil (solid fat content at 20° C.: 13%) in an amount of 0.05% by weight based on the palm olein oil, and they were mixed by stirring at 60° C. to prepare a transparent and homogeneous oil and fat composition. 100 g of this oil and fat composition was collected in each of the two glass sample bottles. The composition in one of the sample bottles was transferred into a 20° C. thermostat and kept therein. After 3 days the visual observation of the state of the oil and fat was conducted. The composition in the other sample bottle was heated in a 185° C. oil bath for a total time of 30 hours, then cooled to 50° C. and kept in a 20° C. thermostat for one day while observing the state of solidification of the oil and fat. Evaluation was made according to the same criterion as described above. The results are shown in Table 1.

TABLE 1

| | Average degree of polymerization of polyglycerin | Degree of esterification of polyglycerin fatty acid ester (%) | Fatty acid composition in polyglycerin fatty acid ester: Component b1*1 (wt %) | Component b2*2 (wt %) | Component b3*3 (wt %) |
|---|---|---|---|---|---|
| Ex. 1 | 10 | 93 | 20 | 70 | 10 |
| Ex. 2 | 10 | 93 | 30 | 60 | 10 |
| Ex. 3 | 10 | 93 | 50 | 43 | 7 |
| Ex. 4 | 10 | 93 | 15 | 75 | 10 |
| Ex. 5 | 10 | 93 | 12 | 80 | 8 |
| Ex. 6 | 10 | 93 | 17 | 66 | 17 |
| Ex. 7 | 10 | 78 | 16 | 74 | 10 |
| Ex. 8 | 6 | 83 | 20 | 70 | 10 |
| Ex. 9 | 4 | 94 | 20 | 70 | 10 |
| Comp. Ex. 1 | — | — | — | — | — |
| Comp. Ex. 2 | 10 | 93 | 15 | 60 | 25 |
| Comp. Ex. 3 | 10 | 93 | 60 | 28 | 12 |
| Comp. Ex. 4 | 10 | 70 | 0 | 55 | 45 |
| Comp. Ex. 5 | 10 | 70 | 15 | 75 | 10 |
| Comp. Ex. 6 | 10 | 93 | 10 | 85 | 5 |

| | Palm olein oil: 1 Rapeseed oil: 1 | Palm olein oil Solid fat content: 13 wt % | |
|---|---|---|---|
| | Solid fat content: 7 wt % State of oil and fat when kept at 15° C. for 2 days | State of oil and fat when kept at 20° C. for 2 days | State of oil and fat when kept at 20° C. for one day after heated at 185° C. for 30 hours |
| Ex. 1 | ⊚ | ○ | ○ |
| Ex. 2 | ⊚ | ○ | ○ |
| Ex. 3 | ○ | ○ | ○ |
| Ex. 4 | ⊚ | ⊚ | ⊚ |
| Ex. 5 | ⊚ | ⊚ | ⊚ |
| Ex. 6 | ○ | ○ | ○ |
| Ex. 7 | ○ | ○ | ○ |
| Ex. 8 | ○ | ○ | ○ |
| Ex. 9 | ○ | ○ | ○ |
| Comp. Ex. 1 | x | x | x |
| Comp. Ex. 2 | Δ | Δ | Δ |
| Comp. Ex. 3 | Δ | Δ | Δ |
| Comp. Ex. 4 | x | Δ | x |
| Comp. Ex. 5 | Δ | Δ | Δ |
| Comp. Ex. 6 | x | x | x |

*1: Saturated fatty acid having 12 carbon atoms.
*2: Equal-percentage mixture of saturated fatty acids having 14, 16 and 18 carbon atoms, respectively. Saturated fatty acid having 16 carbon atoms in Comparative Examples 3 and 4. 17.5:30:17.5 (by weight) mixture of saturated fatty acids having 14, 16 and18 carbon atoms in Comparative Example 5.
*3: Unsaturated fatty acid having 18 carbon atoms.

As seen from Table 1, the following facts is clearly recognized.

The oil and fat composition for frying according to the present invention is hardly solidified when left at 15° C., and the same holds true when the composition is kept at 20° C. It also shows little tendency to solidify even when treated at a temperature of 185° C. In contrast, the composition comprising the component A alone or the composition in which the ratio of the components (b1), (b2) and (b3) is out of the range specified in the present invention tends to solidify when kept at low temperatures (15° C. and 20° C.) and also shows a tendency to solidify when treated at a high temperature (185° C.).

Example 10 and Comparative Example 7

Doughnut dough was fried in the following way by using palm olein oil (solid fat content at 20° C.: 14%) to which 0.5% by weight of PoGE of Example 2 had been added or using palm olein oil alone for comparison, and the effect to the doughnuts and the effect to the fry oil were evaluated. Frying method of doughnut dough:

Doughnut dough was fried at a rate of 40 pieces per day (a total of 180 pieces of doughnut dough were fried) with 3 kg of palm olein oil in two juxtaposed oil baths in one of which no PoGE was added and in the other of which PoGE of the present invention was added. Doughnut dough was prepared by mixing 100 parts of a doughnut mix, 5 parts of whole egg and 40 parts of tap water. The results are shown in Table 2. Evaluation method:

1) Oil pickup of doughnut

The oil bath weights before and after frying of doughnut dough were measured to determine the reduction of oil and fat (the amount of oil and fat which moved into the doughnut) and it was divided by the doughnut weight.

2) Organoleptic evaluation of doughnut

Greasiness and tastiness of doughnuts after cooling were evaluated.

3) State of solidification of fat and oil after used for frying

The oil and fat used for frying was left at room temperature (20° C.) and its state of solidification one day later was visually observed. The oil and fat which assumed a fluid state was described as "fluid state" and the one which was solidified in its entirety was described as "solidified entirely".

4) Acid value of oil and fat

This value was determined according to the standard oil and fat analytical testing method formulated by Japan Oil Chemical Society.

5) Color value of oil and fat

Color value was determined by a Lovibond tintometer according to the above standard oil and fat analytical method. The red color value (R) was multiplied ten times and the yellow color value (Y) was added thereto (10+Y).

6) Carbonyl value of oil and fat

Absorbance of 440 $\mu$m per gram of the sample was determined by the above standard oil and fat analytical method.

Example 11 and Coparative Example 8

Using palm olein oil (solid fat content at 20° C.: 13%) to which 0.5% by weight of PoGE of Example 4 had been added or using palm olein oil alone for comparison, doughnut dough were fried by the same method as in Example 10 and Comparative Example 7, and the effect to the doughnuts and the effect to the fry oil were evaluated. The results are shown in Table 2.

TABLE 2

| | Palm olein oil (solid fat content: 14 wt %) | | Palm olein (solid fat content: 13 wt %) | |
|---|---|---|---|---|
| Evaluation | Comparative Example 7 | Example 10 | Comparative Example 8 | Example 11 |
| Oil pickup of doughnut | 30.1 | 30.4 | 27.9 | 27.5 |
| Organoleptic evaluation of doughnut | Slow in melting in the mouth | Readily melted in the mouth | Slow in melting in the mouth | Readily melted in the mouth |
| State of solidification of oil and fat after frying | Solidified entirely | Fluid state | Solidified entirely | Transparent liquid state |
| Color value (Lovibond tint) | 29.0 | 28.9 | 28.0 | 24.0 |
| Acid value | 0.04 | 0.04 | 0.05 | 0.05 |
| Carbonyl value | 11.3 | 9.2 | 11.4 | 8.8 |

As seen from Table 2. when the doughnut dough are fried with the oil and fat composition for frying of the present invention, the oil and fat after frying presents a fluid state or a transparent state and is also small in color value and carbonyl value, which indicates limited tinting of the oil and fat and minimized deterioration thereof. In contrast, the oil and fat comprising the component A alone is solidified in its entirety and tends to deteriorate in its quality.

What is claimed is:

1. An oil and fat composition for frying comprising:

(A) an oil and fat having a solid fat content of 3 to 20% by weight at 20° C., and (B) a polyglycerin fatty acid ester of 0.01 to 5% by weight based on the total weight of (A) and (B), which has not less than 75% of a degree of esterification thereof and has not less than 90% by weight of the constituting fatty acid of the polyglycerin fatty acid ester which satisfy the following definitions (1) to (3):

(1) the content of the saturated fatty acid having 8 to 12 carbon atoms being 10 to 55% by weight;

(2) the content of the saturated fatty acid having 14 to 22 carbon atoms being 40 to 80% by weight; and (3) the content of the unsaturated fatty acid having 16 to 22 carbon atoms being 5 to 20% by weight.

2. An oil and fat composition for frying according to claim 1, wherein not less than 90% by weight of the constituting fatty acids of the polyglycerin fatty acid ester is constituted by the fatty acids which satisfy the following conditions (1'), (2') and (3'):

(1') the content of the saturated fatty acid having 8 to 12 carbon atoms being 15 to 40% by weight;

(2') the content of the saturated fatty acid having 14 to 22 carbon atoms being 60 to 75% by weight; and (3') the content of the unsaturated fatty acid having 16 to 22 carbon atoms being 5 to 15% by weight.

3. An oil and fat composition for frying according to claim 1, wherein the main component of the oil and fat is palm olein oil or hardened soybean oil.

4. A method for preparing a fried food which comprises frying a food product in an oil and fat composition comprising:

(A) an oil and fat having a solid fat content of 3 to 20% by weight at 20° C., and (B) a polyglycerin fatty acid ester of 0.01 to 5% by weight based on the total weight of (A) and (B), which has not less than 75% degree of esterification and has not less than 90% by weight of constituting fatty acid of a polyglycerin fatty acid ester which satisfy the following definitions (1) to (3):

(1) the content of a saturated fatty acid ester having 8 to 12 carbon atoms being 10 to 55% by weight;

(2) the content of a saturated fatty acid ester having 14 to 22 carbon atoms being 40 to 80% by weight; and (3) the content of an unsaturated fatty acid ester having 16 to 22 carbon atoms being 5 to 20% by weight.

5. A fried food prepared in an oil and fat composition comprising:

(A) an oil and fat having a solid fat content of 3 to 20% by weight at 20° C., and (B) a polyglycerin fatty acid ester of 0.01 to 5% by weight based on the total weight of (A) and (B), which has not less than 75% degree of esterification and has not less than 90% by weight of constituting fatty acid of a polyglycerin fatty acid ester which satisfy the following definitions (1) to (3):

(1) the content of a saturated fatty acid ester having 8 to 12 carbon atoms being 10 to 55% by weight;

(2) the content of a saturated fatty acid ester having 14 to 22 carbon atoms being 40 to 80% by weight; and (3) the content of a unsaturated fatty acid ester having 16 to 22 carbon atoms being 5 to 20% by weight.

6. A fried food according to claim 5, wherein the fried food is a confectionery or other food product.

* * * * *